June 29, 1948.　　　　M. E. CROST　　　　2,444,036
SIGNAL GENERATOR FOR TESTING THE RESOLVING
POWER OF CATHODE-RAY TUBES Filed March 7, 1945　　　　　　　　　　2 Sheets-Sheet 1

INVENTOR.
MUNSEY E. CROST
BY
William D. Hall.
ATTORNEY

June 29, 1948.     M. E. CROST     2,444,036
SIGNAL GENERATOR FOR TESTING THE RESOLVING
POWER OF CATHODE-RAY TUBES
Filed March 7, 1945     2 Sheets-Sheet 2

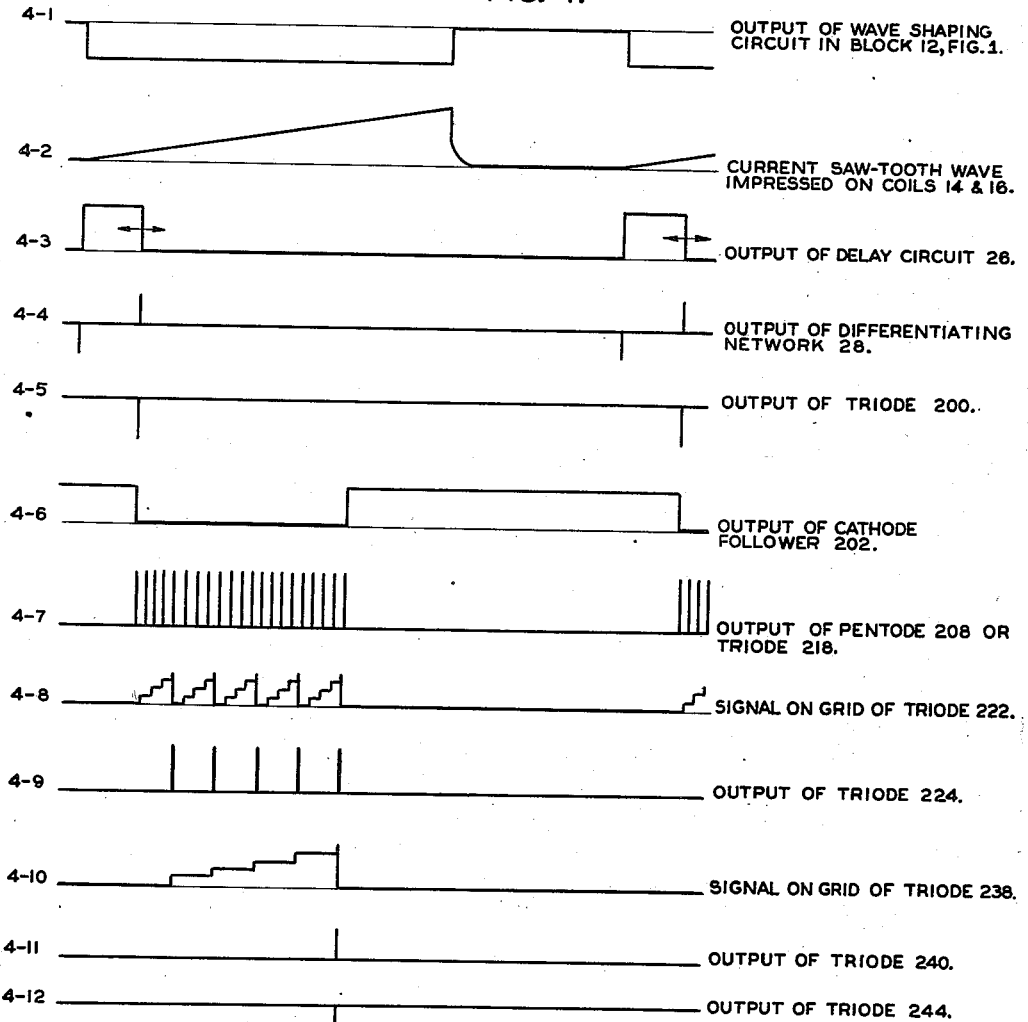

FIG. 4.

4-1 — OUTPUT OF WAVE SHAPING CIRCUIT IN BLOCK 12, FIG. 1.
4-2 — CURRENT SAW-TOOTH WAVE IMPRESSED ON COILS 14 & 16.
4-3 — OUTPUT OF DELAY CIRCUIT 26.
4-4 — OUTPUT OF DIFFERENTIATING NETWORK 28.
4-5 — OUTPUT OF TRIODE 200.
4-6 — OUTPUT OF CATHODE FOLLOWER 202.
4-7 — OUTPUT OF PENTODE 208 OR TRIODE 218.
4-8 — SIGNAL ON GRID OF TRIODE 222.
4-9 — OUTPUT OF TRIODE 224.
4-10 — SIGNAL ON GRID OF TRIODE 238.
4-11 — OUTPUT OF TRIODE 240.
4-12 — OUTPUT OF TRIODE 244.

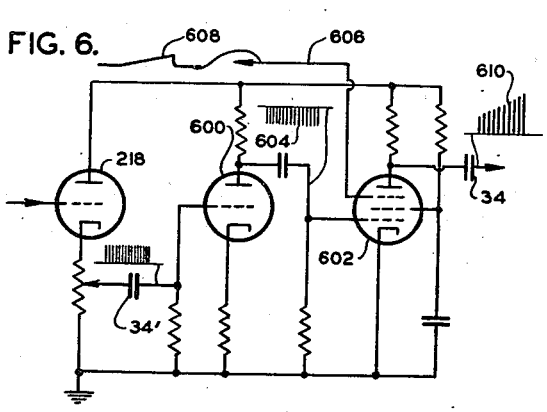

FIG. 6.

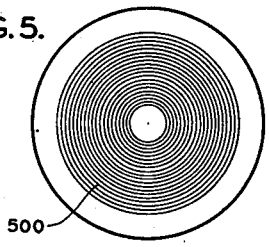

FIG. 5.

INVENTOR.
MUNSEY E. CROST
BY
*William D. Hall*
ATTORNEY

Patented June 29, 1948

2,444,036

UNITED STATES PATENT OFFICE 2,444,036

SIGNAL GENERATOR FOR TESTING THE RESOLVING POWER OF CATHODE-RAY TUBES

Munsey E. Crost, Asbury Park, N. J., assignor to the Government of the United States of America as represented by the Secretary of War Application March 7, 1945, Serial No. 581,542

11 Claims. (Cl. 315—22)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a method and apparatus for determining the resolving power of cathode-ray tubes.

In the past, the resolving power of the cathode-ray tubes was determined by producing a series of straight, parallel lines on the screen of the cathode-ray tube, and by decreasing the spacings between the lines, until the separate lines could no longer be distinguished, the intensity grid of the cathode-ray tube remaining meanwhile at a constant bias voltage. When this stage was reached, the entire width of the raster was measured, and this measured width was used for determining the width of the individual lines, by dividing it by the number of lines in the raster; the total number of straight lines in the raster being known from the characteristics of the circuit producing the lines, or from a count made previous to their merging. Thus, the known method consisted of a line-width measurement derived from a straight line raster which formed a rectangular pattern. The length of the lines was extended to approximately $\frac{7}{10}$ of the diameter of the face of the tube, and by adjusting the parameters of the circuits producing these lines, the lines were brought closer together in the direction perpendicular to their length, until the separate lines merged into one illuminated, rectangular area. The line-width of the cathode-ray tube was expressed by a ratio, the nominator of which was the linear distance of the rectangle measured in the direction perpendicular to the travel of the line, divided by the total number of lines used for producing the rectangle. This type of testing the resolving power of the cathode-ray tube would have been a satisfactory method, if it were not for the several modes of distortion of the luminous spot produced on the oscilloscope screen by the electron beam. These distortions are both electromagnetic and geometric in origin, the degree of distortion increasing in a radial direction from the center of the screen. Furthermore, the distortion is such as to make the luminous spot on the screen oval in shape, the maximal extension of the oval occurring in the direction of the radius of the screen. Thus, when the line-width measurement is performed by means of the rectangular raster, that portion of the raster which is nearest the center of the screen will display the spot with a minimum degree of distortion, while the outermost portion of the rectangle will display the spot with a maximum degree of distortion. Since the angle subtended at the center of the screen by radii drawn to the corners of the compressed rectangular raster will be rather small, it is obvious that such a method of determining the resolving power of the cathode-ray tube is unsatisfactory, since the maximum distortions of the spot will occur in a direction essentially parallel to the lines in the raster, and thus will not be measurable by this method.

The invention discloses a new method and apparatus for determining the resolving power of the cathode-ray tubes which eliminates, to a large extent, the inherent disadvantages of the method described above by substituting polar coordinate system instead of Cartesian system for making the measuring pattern. The new method consists of imposing a fixed number of positive pulses on the control grid of the cathode-ray tube, while at the same time applying a deflecting field which produces a deflection along a radius of the screen. Meanwhile this radial deflection field is rotated about the axis of the tube at a rate small compared with the sweep rate. The resulting intensity-modulation of the beam produces a series of concentric circles. The rotated, radially deflected beam is known in the art as "Class P" presentation of visual images on the screen, and oscilloscopes of this type are known in the art as plan position indicators; the accepted abbreviation being PPI. This type of presentation is accomplished by impressing a sawtooth wave on the magnetic deflection coils of the tube, which makes the electron beam travel at a uniform radial velocity from the center of the screen to its outer edge, while either the coils are rotated at a uniform angular velocity around the longitudinal axis of the tube, or the effective magnetic field is rotated by vectorial addition of varying out-of-phase components. Upon reaching the outer rim of the screen, the beam is quickly returned to the center of the screen, whereupon the cycle repeats itself. While the electron beam is deflected in this manner and travels in the radial direction from the center of the screen to its outer rim, a series of positive pulses are applied to the control grid of the tube during each sweep, and in corresponding positions on the successive sweeps, such intensity-modulation of the beam creating a family of concentric circles on the face of the cathode-ray tube, as illustrated at 500 in Fig. 5. If the duration of the beam-modulating pulses is very short as compared to the rate of radial travel of the beam, the luminous spot produced on the screen will not be appreciably lengthened because of the motion of the sweep during their application, and, consequently, any undue extension of the spot in the radial direction will be primarily due to deflection distortion. As stated above, this may be made very small by decreasing the duration of the modulating pulse with the over-all results much superior to those obtained with the rectangular raster. The distance between the adjacent concentric circles may be varied by altering the spacing between the pulses, thus making it possible to compress the pattern of the concentric circles until the separate circles are no longer distinguishable. Knowing the number of circles in the pattern, and the radial width of the ring formed by the merged circles, it is possible to compute the effective width of each circular trace. This width will include the effect of deflection distortion and, consequently, the present pattern is capable of giving a better picture of the resolution possibilities of any given cathode-ray tube than the rectangular raster pattern used heretofore.

It is, therefore, the principal object of this invention to provide an apparatus for testing the resolving power of the cathode-ray tubes by means of the concentric circle method.

An additional object of this invention is to provide an apparatus for testing the resolving power of the cathode-ray tubes which generates a fixed number of pulses of fixed duration, the spacing between the pulses being adjustable at will.

Still another object of this invention is to provide circuits for testing the resolving power of the cathode-ray tubes which include a source of modulating pulses, the time of occurrence of which may be adjusted so as to vary the spacings between the pulses without varying the duration of each pulse, and a counting circuit connected to said source, the counting circuit suppressing the generation of the modulating pulses, after a predetermined number of pulses has been generated by the source.

Still another object of this invention is to provide a novel, precision type, pulse-counting circuit which is capable of counting the pulses impressed upon it with a greater degree of precision than the counting circuits used heretofore because of the leakage-free characteristics of the circuit.

The novel features which are believed to be characteristic of this invention are set forth in the appended claims. The invention itself, however, both as to its organization and method of operation, together with the further objects and advantages thereof, may best be understood by reference to the accompanying drawings, in which:

Figure 1 is a block diagram of the testing apparatus;

Figure 2 is the schematic diagram of a signal generator;

Figure 3 is the schematic diagram of the circuit used for adjusting the signal generator prior to its use;

Figure 4 illustrates the oscillograms of signals generated in the various portions of the signal generator illustrated in Fig. 2;

Figure 5 illustrates the face of a cathode-ray tube with the concentric circles reproduced on its screen, and Figure 6 is the schematic diagram of the automatic gain control circuit which may be used in connection with the signal generator disclosed in Fig. 2.

Referring to Fig. 1, a master oscillator 10 may be either a multivibrator or a sine wave generator. The wave generated by the oscillator is impressed on the sweep circuit 12 which generates a current saw-tooth wave illustrated at 4—2 in Fig. 4. When the oscillator is of the sine wave type, the latter must be reshaped into a rectangular wave 4—1, Fig. 4, by means of shaping circuits which are well known in the art, and need not be described here. The rectangular wave 4—1, appearing in the output of the shaping circuits, is impressed on the saw-tooth generator comprising a part of the sweep circuit, and it is this rectangular wave that is used for timing the generation of the saw-tooth current wave 4—2. The output of the sweep circuit is connected to the magnetic deflection coils 14 and 16 of the cathode-ray tube 18, the coils being, in one method of operation, rotatively mounted with respect to the cathode-ray tube; the connections between the coils and the sweep circuit are accomplished by means of brushes 20 and 21 connected to the slip-rings 22 and 23. The coils are rotated by means of a gear 24 which is connected to a synchronous motor. The output of oscillator 10 is also connected to a variable delay circuit 26 which generates a rectangular wave, the duration of which may be adjusted for varying the position of the concentric circles on the screen of the oscilloscope tube. This rectangular wave, illustrated at 4—3 in Fig. 4, is differentiated in a differentiating network 28 in a manner illustrated at 4—4, which shows the differentiated signal after reversal of polarity, and the positive portion of this differentiated signal is used in a signal generator 30 for timing the generation of a series of modulating pulses 4—7 which are impressed by means of a potentiometer 32 and a coupling condenser 34 on the control grid 36 of cathode-ray tube 18. It is this series of signals that intensity-modulates the cathode-ray beam, thus resulting in the production of the concentric circles 500 on the screen of the cathode-ray tube, as illustrated in Fig. 5.

As mentioned previously, the spacing between the concentric circles may be varied by adjusting the proper control rheostat in the signal generator, the maximum resolving power of the screen being reached when the spacing between the respective concentric circles is decreased to the point where the separate concentric circles can no longer be distinguished, and they merge into one continuous illuminated band. From the connections illustrated in Fig. 1, it is apparent that the signal generator is synchronized with the sweep circuit by the master oscillator, the latter controlling the sweep, as well as the signal generator.

Referring now to Fig. 2, this discloses the schematic diagram of the signal generator 30 illustrated in the block form in Fig. 1. The circuit of this signal generator begins with a pulse-selecting triode 200, the grid of which is connected through a coupling condenser 201 to the differentiating network 28, Fig. 1. The signal impressed by the differentiating network on the pulse-selector 200 is illustrated at 4—4, and its output is illustrated at 4—5. It consist of a negative pulse which coincides in time with the lagging edge of the rectangular wave 4—3 generated by the variable delay circuit 26. The pulse-selector 200 is nonconductive normally, and therefore only the positive signals make it conductive. The negative signal 4—5, appearing in the output of pulse-selector 200, is impressed on the control grid of tetrode 202. The combination of tetrode 202 and 204 constitutes a "flip-flop" trigger circuit which has two degrees of stability, either a tetrode 202 or tetrode 204 being fully conductive while the other is nonconductive. It represents a modified version of the "Eccles-Jordan" multivibrator circuit, the principal modification being the use of unby-passed resistors in the cathode circuits, and the use of the signal from one cathode. When the operating cycle has established itself, and the condition of stability has been arrived at, tube 202 will be normally fully conductive at the beginning of a sweep period. When negative signal 4—5 from triode 200 is impressed on the grid of tetrode 202, the condition of conductance of the trigger circuit is reversed and tetrode 202 becomes nonconductive, while tetrode 204 becomes fully conductive. The cathode of tetrode 202 is direct-coupled to the cathode of a triode 206, the cathodes of tubes 202 and 206 being grounded through a common resistor 203. The grid of triode 206 is returned to ground through a rheostat 205, so that when tetrode 202 is conducting there will be a large voltage drop across resistor 203 which will place the cathode of triode 206 at a high positive potential with respect to its grid. Triode 206 and pentode 208 constitute a multivibrator, the screen grid of pentode 208 acting as a virtual anode and the plate being electron-coupled to the multivibrator section. This multivibrator does not oscillate while there is a high positive potential on the cathode of triode 206, but when tetrode 202 becomes nonconductive, the cathode of triode 206 is brought to a potential which allows the multivibrator to oscillate. The parameters of this multivibrator are so adjusted that pentode 208 delivers in its output a series of very short positive pulses on the order of one microsecond duration, with relatively long intervals between them. The pulses appearing in the plate output of pentode 208 are illustrated in 4—7, the spacing between these pulses being adjusted by adjusting rheostat 205, this adjustment essentially having no effect on the shape of the pulses 4—7. The oscillating condition of multivibrator 206—208 will continue indefinitely as long as it is not blocked by the positive potential impressed on the cathode of triode 206 by the conduction of current through tetrode 202. The reversion of the conductivities in the triggering circuit 202—204 to the normal state, i. e., with tetrode 202 fully conductive and tetrode 204 nonconductive, will be described later in connection with the description of the counting circuit, the output of which controls the number of pulses delivered by multivibrator 206—208. The positive pulses 4—7 are impressed on the grid of the normally nonconductive triode 212, where they are reversed in phase and clipped because of the amplitude of the pulses 4—7. Since pulses 4—7 over-drive the grid of triode 212 into the positive region, the grid will draw current, the result of which will be the accumulation of negative charge on the right-hand plate of condenser 209. In order to convey this charge to ground, a diode 210 is connected between the right side of this condenser and ground, with the plate of this diode grounded and its cathode connected to the condenser. The diode discharges this accumulated charge very quickly between the positive pulses 4—7. The amplified negative pulses appearing in the plate circuit of triode 212 are impressed on the grid of a power amplifier 214, which is a pentode with a sharp cut-off characteristic. The pulses impressed on the grid of the normally conductive pentode 214 are considerably greater than is necessary to cut-off the current in the pentode, and, consequently, the positive pulses appearing in the plate circuit of this pentode will be considerably clipped, imparting a substantially rectangular wave-form to the positive pulses impressed on the grids of two cathode followers 216 and 218, the input circuits of which are connected in parallel to the output of pentode 214. A small inductance 213 is added to the plate impedance of pentode 214 to help maintain the sharpness of the leading edges of the pulses, and to compensate for the misshaping of the pulses which may otherwise take place because of capacity to ground in the plate circuit of triode 214. The signal taken from a potentiometer 32, in the cathode circuit of triode 218, is used for intensity-modulating the electron beam of the cathode-ray tube 18 through condenser 34, Fig. 1. Cathode follower 216 is used to operate counting circuits illustrated in Fig. 2 directly under the circuits described thus far. Two nearly identical counting circuits are used for accomplishing the desired purpose, which is to count twenty pulses delivered by the multivibrator 206—208, and to shut off the multivibrator upon the completion of the group of twenty consecutive pulses. As will become more apparent later, this is accomplished by impressing a sharp negative pulse on the control grid of tetrode 204, which immediately flips this trigger circuit back into that state of stability during which tetrode 204 is nonconductive, and tetrode 202 is conductive. By making tetrode 202 again conductive, a positive potential is impressed on the cathode of triode 206, which at once stops the oscillation of the multivibrator circuit.

Proceeding now with a more detailed description of the counting circuits, the first counting circuit includes a twin diode 220 and triodes 222 and 224. This circuit is similar in some respects to the known counting circuits, except that it has been arranged to operate on maximum possible repetition rates, and with relatively long time intervals between active periods. The latter condition requires that leakage of charge from the storage condensers in the counting circuit be kept at an absolute minimum between active periods, so that the charge on these condensers at the beginning of each active period may be a constant value independent of the duration of the inactive period. Since the leakage takes place almost always to ground, this condition may be assured by returning the storage condensers to ground potential between active periods. Twin diode 220 accomplished this action, as will be described later. Since the operation of counting circuits of the step-counting type, of which this is an example, requires that the cathode of a tube in the circuit be biased positively with respect to its grid, operation of the grid of triode 222 at ground potential requires that the cathode of triode 222 be normally biased at a positive potential. In the known blocking-oscillator type of counting circuit, this would require a potential-divider across the power supply to the cathode, with a condenser also connected from the cathode to ground to supply the large current necessary for the discharge cycle. The time constant of this R.-C. combination would seriously limit the maximum counting range. The present circuit requires no large surge of current during its operation, and, consequently, is not limited in its speed of operation by anything but the unavoidable tube impedances. The cathode follower 216 transmits positive pulses to the left plate and the right cathode of the diode, which are tied together, through a very small coupling condenser 221. The left cathode of diode 220 is connected to ground through a condenser-potential-divider including a small condenser 223 and a large condenser 225 connected in series. This condenser-potential-divider, especially, condenser 225 and a test terminal 233, is used for testing the performance of the circuit, as will be described later in the specification. The same cathode is connected directly to the grid of triode 222 without any grid-return resistor, and the grid is connected to the plate of triode 224 through a small condenser 226. The cathodes of the triodes 222 and 224 are connected together, and their junction point is grounded through a variable resistance 227. The grid of triode 224 is connected to the cathodes through a variable resistance 228 on one side, and through a coupling condenser 229 to the plate of triode 222 on the other side. The plates of the triodes are connected to the positive terminal of a source of potential 235 through resistances 230 and 231, respectively, the latter resistance being connected in series with a small inductance 232. Resistance 230 is on the order of ten times as large as resistance 231. Triodes 222 and 224 constitute a flip-flop trigger circuit. In this circuit triode 224 is normally conductive, since its grid is tied to the cathode through resistor 228 without any additional bias. Thus, in the normal operation of the circuit, without the charge-steps being impressed on the grid of triode 222, the space current of triode 224 creates a biasing potential across rheostat 227, the rheostat being so adjusted as to maintain triode 222 in the nonconductive state, and its cathode at a positive potential with respect to its grid and the left cathode of diode 220. At this instant, the left cathode of diode 220 and the grid of triode 222 are at approximately ground potential. Because of this distribution of potentials, and this electrically-isolated state of the grid of triode 222, the latter can collect and keep the positive charges impressed upon it when the positive pulses are impressed on the left plate of diode 220. The resulting positive charges are stored on the plates of the condensers 223 and 226. When a positive pulse is impressed on the left plate of diode 220 through condenser 221, it will cause electron current to flow from the condenser combination 223—226, and also, to some extent, from condenser 225, the capacity of the last condenser being much larger than the capacities of the other two condensers. Succession of the positive pulses applied through condenser 221 will build up the positive potential on the condensers 223, 225 and 226 in steps, as indicated at 4—8 in Fig. 4. After a certain number of positive pulses, three in this case, have been impressed, the next succeeding pulse will bring the grid of triode 222 to such a positive potential with respect to ground that the difference between the potentials of the grid and cathode of the triode is less than the cut-off potential. This will make triode 222 conductive, and current will flow through resistor 230, thus lowering the potential normally impressed on condenser 229, and, as a consequence, a negative signal will be impressed on the grid of triode 224, causing a decrease in the conductivity of the latter. When the conductivity of triode 224 decreases, the voltage drop across resistor 227 will also decrease, making the cathode of triode 222 less positive with respect to its grid or, conversely, the grid becomes less negative with respect to the cathode. This charge is in the same sense as the signal which initiated the cycle, and, consequently, regeneration takes place. Triode 222 will become more conductive, while triode 224 wil become less conductive. This regenerative action continues until triode 224 is rendered completely nonconductive and triode 222 fully conductive. The resistor 230 is made considerably larger than the resistor-inductance combination 231—232, so that the maximum current through triode 222 is considerably less than the maximum current through triode 224, thus insuring that in the two cases of conduction there will be a considerably smaller IR drop across resistor 227 when triode 222 is conductive, than when triode 224 is conductive. The large negative chage on the grid of triode 224 created by the discharge of condenser 229 will leak off at a rate determined by the time constant of the condenser-resistor combination 229—228, which may be varied by adjusting resistor 228. When enough of the accumulated charge has been discharged through resistance 228 to allow again a small space current in triode 224, a reverse regenerative cycle occurs, and triode 224 again becomes conductive, while triode 222 becomes nonconductive. During the nonconductive stage of triode 224, the potential impressed on the plate of the triode with respect to ground rises from the initially low value to that equal to the source of potential 235. This high voltage remains there for a short period of time determined by the time constant of the condenser-resistance combination 229—228, and then drops back to its original value, constituting a positive pulse 4—9. This positive pulse is transmitted to the grid of triode 222 through condenser 226 and causes considerable grid current in this tube, thus leaving a rather large negative charge on the grid side of condenser 226. When the original state of the trigger circuit is restored, the negative charge on condenser 226 would place the grid of triode 222, the left cathode of diode 220, and the condenser potential-divider 223—225 all at a considerable negative potential with respect to ground. However, the right plate of diode 220 is connected directly to ground, this connection preventing the left cathode of diode 220 from assuming a potential that would be below ground. That this is true may be seen from the fact that if a negative potential is applied to the left cathode of diode 220, the current will flow to the left plate, and since this plate is directly connected to the right cathode, this current will continue to flow through the right section of the diode. Consequently, the accumulation of negative charge on the grid of triode 222 is prevented by the double diode 220, the action of which, in this respect, may be compared to the action of a well known D. C. restorer or some forms of "clamper" circuits. Accordingly, the grid of diode 220 and 222 may assume a potential which is positive with respect to the left plate of diode 220, and positive with respect to ground, but it is always returned to ground potential upon the completion of the counting cycle by diode 220. At this time the entire first counter section is in its original condition and is ready to receive the succeeding pulses impressed upon it by condenser 221.

Inductance 232 in the plate circuit of triode 224 is used for raising the amplitude of pulses 4—9 appearing in the output circuit of this triode;

and, particularly, to increase the time rate of rise of the leading edges of the pulses. The time constant of the condenser-resistance combination 229—223 which, as it may be recalled, controls the duration of pulse 4—9 is adjusted to give a pulse in the plate circuit of triode 224 of approximately one microsecond duration.

This positive pulse is impressed on the grid of cathode follower 234, which in turn impressed it as a positive signal on the second counting circuit including twin diode 236 and triodes 238 and 240, similar in all respects to the first counting circuit except for small differences in the parameters of the circuit. The number of steps of voltage, and, consequently, the number of pulses counted by the first counting circuit, is determined by the adjustment of resistor 227, and in the embodiment of the circuit described here it is set at four pulses. The second counting circuit is similarly adjusted by means of a rheostat 229 to count five pulses, these steps being illustrated at 4—8 and 4—9 in Fig. 4 for the first counter, and at 4—10 and 4—11 for the second counter. Thus there will be one positive pulse on the plate of triode 240 for every twenty positive pulses impressed on the counting circuits by multivibrator 206—208. Pulse 4—11 is impressed on a cathode follower 242, the output of which is connected to the grid of triode 244, cathode follower 242 being normally conductive and triode 244 nonconductive. The negative pulse 4—12 appearing in the output of triode 244 is impressed through a coupling condenser 245 on the control grid of tetrode 204. It may be recalled from the previous description of the functioning of the trigger circuit 202—204 that at this stage of the operating cycle tetrode 204 is fully conductive, while tetrode 202 is nonconductive; this condition holding the cathode of triode 206 at a low positive potential, thus allowing the latter to oscillate. Immediately upon the appearance of the negative pulse 40—12 on the control grid of tetrode 204, the latter is rendered nonconductive and tetrode 204 fully conductive, the conductive state of tetrode 204 impressing a large positive potential on the cathode of triode 206, thus shutting off the oscillations of multivibrator 206—208 in the manner indicated at 4—7. Thus for each positive trigger input pulse 404 impressed on the grid of triode 200 there will be twenty positive pulses impressed on condenser 34 and control grid 36 of the cathode-ray tube 18. By adjusting rheostat 205, the spacing between these pulses may be changed without appreciably affecting their shape and duration, and without affecting the total number of pulses in the individual group. Fig. 4 is one possible phase relationship of this series of pulses with respect to the sawtooth wave 4—2. This phase relationship may be adjusted by adjusting the duration of the rectangular wave 4—3, and as this rectangular wave is shortened, the concentric circles 500 are moved closer and closer to the center of the screen and vice versa. Thus by adjusting the position of the trigger voltage pulse 4—5, the pulses used for determining the resolving power of the screen may be moved in the radial direction along the sweep to allow determination of the resolving power of the cathode-ray tube within any annular portion of the screen. Upon moving the concentric circles 500 to the desired portion of the screen, the spacing between the test pulses 4—7 is decreased until they merge into a single illuminated annular band, and when this condition is obtained, the resolving power of the cathode-ray tube in that particular annulus is determined by measuring the radial width of this band and by dividing it by twenty, which is the number of the concentric circles in the annulus.

From the description of the connections and functioning of the counting circuits, it is apparent that they will be affected by the amplitude and the duration of the signals impressed upon them, both of these factors influencing the charge accumulated on the condensers controlling the counting circuits. This being the case, it is more convenient to adjust the signal generating circuit, including tubes 200 through 218, when the counting circuits are disconnected from the signal generating circuit. However, proper functioning of the signal generating circuits calls for some means for periodically stopping the oscillations of multivibrator 206—208; the circuit disclosed in Fig. 3 is the one which is used for accomplishing this purpose during the preliminary adjustments of the parameters of the signal generator. The purpose of this circuit is to generate a rectangular wave which is impressed on condenser 245 in order to block the oscillations of the multivibrator after it has generated a number of pulses occupying a predetermined time duration. The input circuit 300 of this auxiliary timer may be connected to the screen grid of tetrode 202 at a terminal 260 indicated in Fig. 2. The rectangular wave impressed on a condenser-resistance combination 301—302 is differentiated to give a single positive pulse when the first switch-over of tetrode 202 from the conducting to nonconducting state takes place, and a negative pulse when the conductivity of the trigger circuit 202—204 is reversed. These pulses are impressed on a flip-flop trigger circuit 304—306 which generates a negative, rectangular pulse in the common cathode resistor 303 of a duration determined by the time constant of the grid current of triode 306. This rectangular wave is differentiated in a condenser-resistor combination 305—307, creating a negative pulse at the beginning of the rectangular wave and a positive pulse at its end on the grid of triode 308. Triode 308 is normally nonconductive so that the negative pulse on its grid is uneffective, and the positive signal is amplified and appears as a large negative signal in the plate circuit of this triode. This negative pulse is impressed on the control grid of tetrode 204 through a condenser 245' which corresponds to condenser 245 in Fig. 2, the latter being disconnected from the signal generator during the adjustment period. From the above description, it follows that the auxiliary timer performs the function normally assigned to the pulse counting circuits, namely, to reverse the state of conductivity of the trigger circuit 202—204, and to limit the total number of pulses appearing in the output of triode 218. With the signal generator thus controlled by the auxiliary timer, the parameters of the circuits in the signal generator may be adjusted so as to produce the signals of the desired repetition rate, duration, shape, and amplitude in the multivibrator 206—208, the amplifying and clipping circuits 212, 214, and the cathode followers 216 and 218, these adjustments having no effect on the auxiliary timer.

The test circuit illustrated in Fig. 2 delivers the test pulses 4—7 of fixed amplitude as illustrated at 4—7 in Fig. 4. As mentioned previously these are impressed on the control grid of cathode-ray tube 18 where they intensity-modulate the electron beam so as to produce a series of concentric circles 500 on its screen. Since "Class P" presentation is used, the peripheral velocity of the cathode-ray beam is a function of its position from the center of the screen, this velocity linearly increasing as the beam travels from the center to the outer rim of the screen. When the constant amplitude signals 4—7 modulate the beam traveling in this manner, they will produce higher intensities of illumination in the regions near the center of the screen and vice versa, thus affecting the accuracy of the determinations of the resolving powers at different portions of the screen. This undesirable effect may be eliminated by introducing an automatic gain control circuit which interconnects the saw-tooth generator with the cathode follower 218, this circuit controlling the amplitude of the modulating signals 4—7 in such a manner that their amplitude increases linearly as the beam travels outwardly in the radial direction. This circuit is illustrated in Fig. 6, and it includes the cathode follower 218 corresponding to the similarly numbered cathode follower in Fig. 2, an inverter 600, and an automatic-gain-control pentode 602. The functioning of the cathode follower 218 has been given in connection with the description of Fig. 2 and need not be repeated here. Its output, appearing across condenser 34, consists of a series of uniformly spaced, positive pulses 4—7, which are impressed on the grid of inverter 600, which in turn impresses them as a series of negative pulses 604 on the control grid of pentode 602. The screen grid and the plate of this pentode are connected through resistances to a source of positive potential in a conventional manner, and its cathode is connected directly to ground so that it is normally in a conductive state. The suppressor grid of pentode 602 is connected by means of a conductor 606 to the output of a saw-tooth generator of adjustable signal amplitude and bias in the sweep circuit 12, Fig. 1, this conductor being also shown in Fig. 1. The saw-tooth generator impresses a positive saw-tooth voltage wave 608 on the suppressor grid of the pentode, which increases the transconductance of pentode 602 as the voltage impressed on the suppressor grid rises to a higher positive potential. The result of this continuously increasing transconductance is that the positive pulses 610 appearing in the plate circuit of pentode 602 have a linearly varying amplitude, this amplitude increasing from pulse to pulse, as illustrated at 610. These pulses are impressed on the control grid of cathode-ray tube 18 through coupling condenser 34, Figs. 1 and 6, in a manner previously described. With the automatic-gain-control circuit of Fig. 6 interposed between the control grid 36 of the cathode-ray tube 18 and the cathode follower 218, the luminous intensities of the concentric circles 500 are equalized, and, as a result, more accurate determinations of the resolving power of the screen are made possible.

The functioning of the test circuit has been described in connection with the concentric circles 500 as if they were of a continuous nature. Whether the circles are of a continuous nature and appear as uniformly illuminated circles, or as a series of bright arcs or dots, the locus of which is a circle, depends upon the retentivity of the screen, the angular velocity of scanning, and the repetition rate of the modulating pulses 4—7. These may be adjusted so as to produce uniformly illuminated circles or a series of dots or arcs located around the circle, and the resolving power of the cathode-ray tube may be determined with an equal degree of success, irrespective of the selected values for the above mentioned factors.

The invention has been described in which the sought results were accomplished by using multivibrators in the counting circuits and for generating a rectangular wave for controlling the pulse oscillator which is also of the multivibrator type. The same results may be accomplished by substituting blocking oscillators in place of the multivibrator type oscillator 206—208 and the multivibrator type counters 222—224 and 238—240. The advantages of using the blocking oscillators in the indicated modifications resides in the fact that it is possible to obtain narrower pulses with the circuits of this type. An additional advantage in using blocking oscillators resides in the fact that it is generally possible to obtain higher voltage output signal from the oscillators of this type. Since the circuits of the blocking oscillators are well known in the art, the suggested modifications have not been illustrated in any of the figures.

While the invention has been described with reference to several particular embodiments, it will be understood that various modifications of the apparatus shown may be made within the scope of the following claims.

I claim:

1. The method of testing the resolving power of a cathode-ray tube which includes the steps of generating a periodic wave for producing plan position indicator presentation of signals on the screen of said tube, generating a timing pulse in an adjustable time relationship with respect to said wave, starting the generation of a series of marker pulses with the aid of said timing pulse, intensity-modulating said cathode-ray beam with said series of pulses so as to produce a plurality of concentric luminous circles on said screen, and blocking the generation of said series of pulses after the generation of the predetermined number of pulses, whereby a predetermined number of said marker pulses is generated for each cycle of said periodic wave.

2. The method of testing the resolving power of a cathode-ray tube as defined in claim 1 which further includes the step of diminishing the spacings between said circles, with the wave-form of the individual pulses in said series of pulses remaining substantially constant, until a substantially uniformly-illuminated annulus is produced on said screen.

3. The method of testing the resolving power of a cathode-ray tube as defined in claim 1 which further includes the step of varying the instant of the generation of said timing pulse with respect to the zero-time of said wave for determining the resolving powers of different portions of said screen.

4. The method of determining the resolving power of a cathode-ray tube as defined in claim 1 which further includes the step of increasing the amplitude of each individual pulse as compared to the amplitude of the preceding pulse in said series of marker pulses, thereby compensating for the increasing peripheral velocity of said cathode-ray beam along its radial path by intensity-modulating said beam with the pulses of increasing amplitude so as to maintain the luminosities of all concentric circles substantially constant and independent of their position on said screen.

5. In a circuit for determining the resolving power of a cathode-ray tube, a master oscillator, means connected between said oscillator and said tube, and timed by said oscillator for producing plan position indicator presentation of signals on the screen of said tube, a pulse generator connected to said oscillator and timed by said oscillator for initiating a series of pulses, the output of said pulse generator being connected to the intensity-grid of said tube, whereby the beam of said tube is intensity-modulated by said series of pulses so as to produce a series of concentric luminous circles on said screen, and a pulse-counting circuit connected across said pulse generator, said pulse-counting circuit blocking said pulse generator after receiving a predetermined number of pulses from said generator.

6. In a circuit for determining the resolving power of a cathode-ray tube as defined in claim 5 which further includes an adjustable network for varying the spacing between said pulses.

7. In a circuit for determining the resolving power of a cathode-ray tube as defined in claim 5 which further includes an adjustable network connected between said master oscillator and said pulse generator, the setting of said network controlling the radial position of said circles on said screen, whereby the resolving power of any portion of said screen may be determined by varying the setting of said network.

8. In a circuit for determining the resolving power of a cathode-ray tube, a master oscillator, a sweep circuit generating a sweep wave connected on its input side to said oscillator and on its output side to the beam-deflecting means of said tube, said beam-deflecting means producing plan position indicator presentation of signals on the screen of said tube, a trigger pulse generator connected to said oscillator, a flip-flop trigger circuit connected to said generator, said trigger pulse shifting said trigger circuit into the second state of conductivity, opposite its first and normal state of conductivity, an oscillator connected to said trigger circuit, said oscillator oscillating as long as said trigger circuit is in said second state of conductivity, connections between said oscillator and the intensity grid of said tube, said oscillator intensity-modulating the electron beam of said tube so as to produce concentric, luminous circles on the screen of said tube, a pulse-counting circuit connected to said oscillator, said pulse-counting circuit generating a single pulse after counting a predetermined number of pulses impressed upon it by said oscillator, and connections between the output of said counting circuit and said flip-flop trigger circuit, whereby said single pulse restores the first state of conductivity of said trigger circuit and blocks said oscillator.

9. In a circuit for determining the resolving power of a cathode-ray tube as defined in claim 8 in which said oscillator is an asymmetric multivibrator generating substantially rectangular pulses of short duration, the spacing between said pulses being greater than the duration of the individual pulses.

10. In a circuit for determining the resolving power of a cathode-ray tube as defined in claim 8 in which said counting circuit includes a first counting circuit connected to said oscillator, and a second counting circuit connected to the output of said first counting circuit, said second counting circuit generating said single pulse which reverses the state of conductivity of said trigger circuit.

11. In a circuit for determining the resolving power of a cathode-ray tube as defined in claim 8 which further includes an automatic-gain-control circuit between said oscillator and the intensity grid of said tube, said gain-control circuit increasing the intensity of the modulating signals impressed on said intensity-grid so as to compensate for the increasing peripheral velocity of said electron beam during the simultaneous, radial and rotational travel of said beam.

MUNSEY E. CROST.

REFERENCES CITED

The following references are of record in the file of this patent:

UNITED STATES PATENTS

| Number | Name | Date |
|---|---|---|
| 2,241,809 | DeForest | May 13, 1941 |
| 2,313,966 | Poch | Mar. 16, 1943 |
| 2,348,016 | Michel | May 2, 1944 |
| 2,376,395 | Skellett | May 22, 1945 |
| 2,384,379 | Ingram | Sept. 4, 1945 |